3,677,981
SILICONE ELASTOMERIC COMPOSITIONS AND A METHOD FOR PREPARING SILICONE SPONGE RUBBERS THEREFROM
Tadashi Wada, Kunio Itoh, and Naoyoshi Kuga, Annaka, Japan, assignors to Shinetsu Chemical Company
No Drawing. Filed May 25, 1970, Ser. No. 40,428
Claims priority, application Japan, June 25, 1969, 44/50,184
Int. Cl. C08j 1/20
U.S. Cl. 260—2.5 S                  15 Claims

ABSTRACT OF THE DISCLOSURE

The silicone elastomeric compositions comprise:
(a) from 80 to 99 parts by weight of a diorganopolysiloxane gum having a viscosity of at least 1,000,000 cs. at 25° C., and containing from 0.025 to 0.25 mole percent of vinyl-group containing siloxane units in its molecule;
(b) from 1 to 20 parts by weight of a diorganopolysiloxane having a viscosity of at least 10 cs. at 25° C., and containing at least 10 times as many mole percent of vinyl-group containing siloxane units in its molecule as is contained in one molecule of component (a);
(c) an organohydrogen polysiloxane in an amount such that its Si—H linkages are from 50 to 200 mole percent of the total amount of vinyl groups contained in the above-given components (a) and (b), and containing at least three Si—H linkages in its molecule;
(d) from 20 to 100 parts by weight of a silica filler having a surface area of at least 150 m.$^2$/g.;
(e) from 1 to 10 parts by weight of a blowing agent; and
(f) a catalytic amount of a platinum compound.

When cured at elevated temperature, such elastomeric compositions give silicone sponge rubbers having high tensile strength and an internal structure of continuous foam. The cured products contain no residue of the curing agent. Thus they possess excellent compression set, resilient elasticity, resistance to heat, cold, and steam, electrical properties and flame retardant property. They are therefore useful as insulating materials, soft packing materials, gasket cushion materials, toilet sponge puffs and sponge filters.

SUMMARY OF THE INVENTION

This invention relates to novel silicone elastomeric compositions, and to a method of preparing therefrom silicone sponge rubber having greatly improved properties.

It is well known that silicone sponge rubber can be prepared by curing at an elevated temperature mixtures of a diorganopolysiloxane gum, consisting of methyl groups and a small amount of vinyl groups, a low-molecular siloxane ester or silanol, a filler, a blowing agent and an organic peroxide. The resultant silicone sponge rubber exhibits excellent resistance to heat, cold, and weather. Additionally it possesses superior electrical properties, shock absorption, and resilient elasticity. These properties account for its wide use in various fields as soft-packing materials, gasket cushion materials, and insulating materials. However, its porous structure is comprised mostly of foams which are independent of each other. Moreover, its tensile strength is poor. Therefore, it cannot be employed as sponge filters, toilet sponge puffs or medical sponges, through which a liquid has to pass, or which must be impregnated with a liquid. This inadequacy is especially felt when the silicone sponge rubber is employed in aircraft or car parts.

An object of the present invention is to provide heat-curable silicone elastomeric compositions, which when cured, will give silicone sponge rubber having a structure of continuous foam which is free from the above-described faults, and which possesses high tensile strength. Another object of the invention is to provide a method for preparing silicone sponge rubber which contains no decomposed residue of the curing agent and which as a result has excellent compression set, resilient elasticity, resistance to heat, cold and steam, superior electrical and flame retardant properties. Still another object of the invention is to provided silicone sponge rubber which is suitable as insulating and soft packing materials, toilet sponge puffs, sponge filters and gasket cushions.

The compositions of the invention consist of (a) from 80 to 99 parts by weight of a diorganopolysiloxane gum having a viscosity of at least 1,000,000 cs. at 25° C., and containing from 0.025 to 0.25 mole percent of vinyl-group containing siloxane units in the molecule; (b) from 1 to 20 parts by weight of diorganopolysiloxane, having a viscosity of at least 10 cs. at 25° C., and containing at least 10 times as many mole percent of vinyl-group containing siloxane units in its molecule as is contained in one molecule of component (a); (c) an organohydrogen polysiloxane in an amount such that its Si—H linkages are from 50 to 200 mole percent of the total amount of vinyl groups contained in the above-given components (a) and (b), and containing at elast three Si—H linkages in its molecule; (d) from 20 to 100 parts by weight of a silica filler having a surface area of at least 150 m.$^2$/g.; (e) from 1 to 10 parts by weight of a blowing agent; and (f) a catalytic amount of a platinum compound.

We have observed that when the above-given organopolysiloxane components (a) and (b), which are principal components of the elastomeric compositions, are heated together with an organohydrogen polysiloxane, a blowing agent and a platinum catalyst, silicone sponge rubber having an unexpectedly high tensile strength and a continuous foam structure can be obtained. In other words, we found, that, to enhance the tensile strength of a silicone sponge rubber, the distribution of the bridging structure contained in the cured elastomer has to be nonuniform. After conducting various experiments, we found out that when a diorganopolysiloxane gum (component (a)), containing in its molecule as little as from 0.025 to 0.25 mole percent of vinyl group-containing siloxane units (CH$_2$=CHR'SiO) and a diorganopolysiloxane (component (b)) containing at least 10 times as many mole percent of vinyl-group containing siloxane units in its molecule as is contained in one molecule of component (a), assorted in the ratio given above, are cured, together with an organohydrogen polysiloxane (component (c)) having at least three Si—H linkages in its molecule in an amount such that its Si—H linkages are from 50 to 200 mole percent of the total amount of vinyl groups contained in components (a) and (b) the distribution of the vinyl groups in the product will be nonuniform. This causes the position of the bridging structure to also be nonuniform. We further found that if the curing of said elastomeric compositions is carried out by addition reaction in the presence of a platinum compound catalyst, the formation of the foams becomes continuous. Further we found that we could obtain same without fear of the decomposed catalyst remaining in the product.

A more detailed description of the invention follows:
Components (a) and (b) are each composed of a polysiloxane structure, consisting of (i) siloxane units represented by the unit formula:

$$(R_2SiO)_n$$

wherein R is a saturated monovalent hydrocarbon radical, either substituted or unsubstituted, such as a methyl, ethyl, trifluoropropyl or phenyl group, and $n$ is a positive integer, and (ii) vinyl siloxane units represented by the unit formula:

$$(CH_2{=}CHR'SiO)_m$$

wherein R' is a saturated monovalent hydrocarbon radical, either substituted or unsubstituted, $m$ is a positive integer, and whose molecular chains are terminated by a monovalent hydrocarbon radical, such as a hydroxyl, methyl, ethyl, trifluoropropyl, phenyl or vinyl group. These can be prepared by polymerizing, to the desired degree of polymerization, for example, a mixture of some cyclosiloxanes such as octamethyltetracyclosiloxane, hexamethyltricyclosiloxane, tetramethyltetravinylcyclosiloxane, octaphenyltetracyclosiloxane, hexaphenyltricyclosiloxane, and tetramethyltetraphenylcyclosiloxane, in the present of an alkali or acid catalyst.

Component (a) is a main raw material used in the formation of the silicone sponge rubber of the invention. It contains in its molecule from 0.025 to 0.25 mole percent of vinyl-group containing siloxane units. Its viscosity must be at least 1,000,000 cs. at 25° C. so as not to reduce the strength of the silicone sponge rubber.

Component (b) which is of diorganopolyosiloxane must contain in its molecule at least 10 times as many mole percent of vinyl-group-containing siloxane units as is contained in one molecule of component (a), but its degree of polymerization need not be very high. What is only required is that it have a viscosity of at least 10 cs. at 25° C.

Components (a) and (b) are mixed in the ratio of from 80 to 99 parts by weight of (a) to from 1 to 20 parts by weight of (b). If the mixture of the two components has too low a viscosity or has an extremely high viscosity, then the mixture of components (a) and (b) may not give a sponge rubber having the superior physical properties sought. Thus the viscosity of the mixture of the two components should be preferably kept in the range of from 1,000,000 to 50,000,000 cs. at 25° C.

The organohydrogen polysiloxane employed as component (c) contains, as mentioned above, at least three Si—H linkages in its molecule. Examples of such organohydrogen polysiloxanes include (i) methylhydrogen polysiloxanes, of various degrees of polymerization, whose molecular chains are terminated by trialkylsilyl group, (ii) tetrasiloxanes represented by:

$$Si[OSi(CH_3)_2H]_4$$

(iii) siloxane copolymers consisting of $SiO_2$ unit and $(CH_3)_2SiHO_{0.5}$ unit, and (iv) copolymers of methylhydrogen siloxane and dialkyl siloxane. These materials are readily prepared by known methods. The curing reaction, conducted by component (c) is an addition reaction between the Si—H linkage in component (c) and the vinyl group connected to the silicon atom in components (a) and (b). The organic group which is directly connected to the silicon atom of the Si—H linkage in the component should preferably be of a low molecular weight such as, for example, a methyl group.

If the amount of component (c) employed is too small, sufficient curing cannot be obtained. If it is too large, the tensile strength and heat resistance of the product are reduced. If the amount of component (c) is adequate, a more advantageously arranged bridging structure results. Taking this into consideration, it is recommended that the amount of Si—H linkages should be from 50 to 200 mole percent of the total amount of vinyl groups contained in components (a) and (b), or approximately from 0.1 to 10 parts by weight.

Silica filler used for the preparation of prior art silicone rubbers may be employed as component (d). Examples of silica filler include finely divided silica such as fumed silica and silica aerogel. If the particle size of the silica is large, the mechanical strength of the silicone rubber obtained will be reduced. Thus the particle size must be fine enough so that the silica filler will have a surface area of at least 150 m.$^2$/g. as measured by the nitrogen absorption method. The amount of such silica to be admixed with the above-given amounts of components (a) and (b) is from 20 to 100 parts by weight.

The blowing agent, which is called component (e) is employed for the purpose of preparing a foam rubber of the silicone composition, consisting of components (a), (b), (c), and (d). The blowing agent should be readily thermally decomposable to generate gas, or easily gasified, in the temperature range of from 100 to 400° C. at which temperature the curing is conducted. Blowing agents that are preferred are those which generate 10 volumes of gas per volume of blowing agent. These preferred blowing agents are exemplified by azobisisobutyronitrile, dinitrosopentamethylenetetramine, N,N' - dimethyldinitrosoterephthalamide, and diaminobenzene. From 1 to 10 parts by weight of blowing agent are added to the above-given amounts of components (a) and (b).

The platinum catalyst added as component (f) is utilized to cause the addition reaction, and also to make the foams formed in the cured product continuous. The platinum catalyst also serves to inhibit the retention in the product of the decomposed residue. The platinum catalyst is preferably selected from the group of soluble platinum compounds such as, for example, (a) chloroplatinic acid, (b) a complex of (i) chloroplatinic acid and (ii) ethylene, propylene, butadiene, cyclohexane, or the like, and (c) a complex of chloroplatinic acid and an alkylamine such as a salt of chloroplatinic acid-n-butylamine. Only a catalytic amount of the catalyst is required, viz, from 1 to 100 p.p.m. or so of the total weight of components (a) and (b).

The elastomeric compositions of the present invention are prepared by kneading, on a two-roll rubber mill, a kneader, or a Banbury mixer, mixtures of the above-given components (a), (b), (c), (d), (e), and (f). Other materials which can be optionally incorporated within the mixtures if required include for example a dispersing agent such as a low-molecular siloxane ester and silanol, e.g., diphenylsilanediol or diphenylmethyl silanol; a heat resistance improving agent such as iron oxide, cerium oxide or iron octoate; pigments; and a blowing assistant. In order to further improve the stability upon storage of the product, well-known organic phosphorus compounds or organic amines may be added. There is no required particular order in which the above-given components are to be mixed. However it is recommended that components (a), (b), and (d) be uniformly mixed first, and that components (c), (e), and (f) then be added to the mixture of (a), (b) and (d).

The compositions of the present invention are heated at a temperature of between 100 and 400° C., either under atmospheric pressure or under elevated pressure, for a period of from five minutes to five hours, preferably, from 10 minutes to 1 hour, and then, if necessary, at a temperature of between 150 and 250° C. for a period of from 1 to 24 hours to carry out a post curing. Elastic sponge rubbers possessing high tensile strength are obtained. In contrast to ordinary silicone sponge rubbers in whose preparation peroxides are usually employed as curing agents, no residue of the decomposed curing agents remains in the finished products produced by the method of the present invention. Silicone sponge rubbers prepared according to the present invention are superior in compression set, resilient elasticity, resistance to heat, cold, and steam, and electrical and flame retardant properties. Consequently they are very useful as insulating materials, toilet sponge puffs, and sponge filters. They are especially well-suited where high tensile strength is required.

The details of the invention will be further described in the following examples in which parts recited are all parts by weight.

EXAMPLE 1

90 parts of diorganopolysiloxane gum (component (a)), having a viscosity of about 5,000,000 cs. at 25° C., and consisting of 99.85 mole percent of dimethylsiloxy unit, 0.125 mole percent of methyl vinyl siloxy unit, and 0.025 mole percent of dimethyl vinyl siloxy unit, 10 parts of diorganopolysiloxane (component (b)), having a viscosity of about 7,000,000 cs. at 25° C., and consisting of 96.975 mole percent of dimethyl siloxy unit, 3 mole percent of methylvinyl siloxy unit, and 0.025 mole percent of dimethylvinylsiloxy unit; (viscosity of the mixture of (a) and (b): 5,500,000 cs.), 40 parts of fumed silica (component (d)) having a surface area of 200 m.$^2$/g., and 4 parts of diphenylsilanediol were kneaded on a roller. The kneaded composition was then heated in a hot blast at 200° C. for 4 hours. 2 parts of azobisisobutyrodinitrile (component (e)), as a blowing agent, 0.7 part of methylhydrogen polysiloxane (component (c)) having a viscosity of about 400 cs. at 25° C., and consisting of 66.7 mole percent of $H(CH_3)_2SiO_{0.5}$ unit and 33.3 mole percent of $SiO_2$ unit, and 0.25 part of a 1% methanol solution of $H_2PtCl_6 \cdot 6H_2O$ (component (f)) were then added. The mixture thus prepared was cured at 200° C. for 20 minutes between two iron plates placed at a distance of 10 mm. The product obtained was a silicone sponge rubber composed of uniform and continuous fine foams. The physical properties of the sponge rubber were found to be as follows. The compression set was measured in accordance with ASTM D-395 (25% deflection, 180° C., 22 hours).

Apparent density: 0.36
Tensile strength: 25 kg./cm.$^2$
Elongation: 290%
Compression set: 17%
Flame retardant property: Observed When the sheet thus prepared was further heated at 250° C. for 70 hours, its tensile strength was found to be 16 kg./cm.$^2$ and elongation 120%.

Controls 1, 2 and 3

Components (a), (b), (c), (d) and (e) were assorted and kneaded together with a curing agent as shown in Table 1 and cured by the same method as described in Example 1. Silicone sponge rubbers composed of independent foams were obtained. The physical properties of these silicone sponge rubbers and of the one prepared by subjecting the silicone sponge rubber Control No. 1 to heating at 250° C. for 70 hours are shown in Table 2.

TABLE 1

| Control number | 1 | 2 | 3 |
|---|---|---|---|
| Components (parts): | | | |
| (a) | 100 | 90 | 100 |
| (b) | | 10 | |
| (c) | | | 0.7 |
| (d) | 40 | 40 | 40 |
| (e) | 2 | 2 | 2 |
| Curing agent (kind) (parts): | | | |
| Tert-butylperbenzoate | 1 | 1 | |
| What was employed in Example 1 | | | 0.25 |
| Diphenylsilanediol | 4 | 4 | 4 |
| Viscosity of the mixture of Component (a) and (b), (cs.) | | 5,500,000 | |

TABLE 2

| Control number | 1 | 2 | 3 |
|---|---|---|---|
| Apparent density | 0.38 | 0.36 | 0.36 |
| Tensile strength (kg./cm.$^2$) | 14 | 19 | 15 |
| Elongation (percent) | 300 | 250 | 320 |
| Compression set (percent) | 30 | 24 | 17 |
| Flame retardant property | (¹) | (¹) | Observed |
| After being heated at 250° C. for 70 hours: | | | |
| Tensile strength (kg./cm.$^2$) | 9 | | |
| Elongation (percent) | 140 | | |

¹ Not observed.

EXAMPLE 2

95 parts of diorganopolysiloxane gum (component (a)) as was employed in Example 1, 5 parts of silicone oil (component (b)), having a viscosity of 700 cs. at 25° C., and consisting of 89 mole percent of dimethylsiloxy unit, 10 mole percent of methylvinylsiloxy unit and 1 mole percent of trimethylsiloxy unit (viscosity of the mixture of (a) and (b): 3,500,000 cs.), 2.5 parts of methylhydrogen polysiloxane (component (c)), having a viscosity of 200 cs. at 25° C. and consisting of 44 mole percent of $(CH_3)_2SiO$ unit, 12 mole percent of

unit, and $CH_3SiO_{15}$ unit, 40 parts of fumed silica (component (d)), having a surface area of 200 m.$^2$/g., 3 parts of dinitrosopentamethylenetetramine (component (e)), 0.25 part of a 1% 2-ethylhexanol solution of

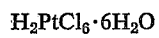

(component (f)), and 4 parts of diphenylsilanediol were kneaded using the method described in Example 1. The mixture thus prepared was cured at 200° C. for 20 minutes between two iron plates placed at a distance of 10 mm. A silicone sponge rubber A, composed of uniform and continuous fine foams, was obtained. When the same mixture, flattened into a 5 mm. sheet, was cured in an oven at 300° C. for 2 minutes, under atmospheric pressure, a sponge rubber B, composed of continuous but comparatively large foams, was obtained.

The physical properties of silicone sponge rubbers A and B and of another sponge rubber prepared by heating the silicone sponge rubber A at 250° C. for 70 hours are set forth in Table 3 below.

TABLE 3

| Kind of silicone sponge rubber | A | B |
|---|---|---|
| Apparent density | 0.36 | 0.33 |
| Tensile strength (kg./cm.$^2$) | 27 | 22 |
| Elongation (percent) | 320 | 290 |
| Compression set (percent) | 15 | 19 |
| Flame retardant property | Observed | Observed |
| After being heated at 250° C. for 70 hours: | | |
| Tensile strength (kg./cm.$^2$) | 18 | |
| Elongation (percent) | 150 | |

EXAMPLE 3

A silicone sponge rubber was prepared as described in Example 2 excepting that an organopolysiloxane gum was employed as component (a) in an amount of 95 parts. It had a viscosity of about 10,000,000 cs. at 25° C. and consisted of 96.83 mole percent of dimethylsiloxy unit, 0.15 mole percent of methyl vinyl siloxy unit, 3.0 mole percent of diphenyl siloxy unit, and 0.02 mole percent of trimethyl siloxy unit. The silicone sponge rubber was composed of continuous foams and possessed an excellent flame-retardant property.

The viscosity of the mixture of components (a) and (b) was about 9,000,000 cs. at 25° C., and the physical properties of the silicone sponge rubber obtained were as follows:

Apparent density: 0.35
Tensile strength: 27 kg./cm.$^2$
Elongation: 340%
Compression set: 21%

After being heated at 250° C. for 70 hours:

Tensile strength: 18 kg./cm.$^2$
Elongation: 240%

Control 4

A silicone sponge rubber was prepared as described in Example 3 excepting that an organopolysiloxane gum was employed as component (a) in an amount of 95 parts. It had a viscosity of about 1,000,000 cs. at 25° C. and consisted of 96.78 mole percent of dimethylsiloxy unit, 0.15 mole percent of methyl vinyl siloxy unit, 3.0 more percent of diphenyl siloxy unit, and 0.07 mole percent of trimethyl siloxy unit (viscosity of the mixture of components (a) and (b): 1,000,000 cs. or below at 25° C.). The silicone sponge rubber was composed of foams lacking in uniformity and was found to have a tensile strength of only 10 kg./cm.$^2$.

Control 5

A silicone sponge rubber was prepared as described in Example 2 excepting that (i) an organopolysiloxane gum as used in Example 3 was employed as component (a) in an amount of 80 parts, (ii) a diorganopolysiloxane was employed as component (b) in an amount of 20 parts. It had a viscosity of about 7,000,000 cs. at 25° C., and consisted of 96.975 mole percent of dimethylsiloxy unit, 3 mole percent of methyl vinyl siloxy unit and 0.025 mole percent dimethylvinyl siloxy unit, and (iii) hydrogen polysiloxane was employed as component (c) in an amount of 0.1 part. It had a viscosity of 200 cs. at 25° C. and consisted of 44 mole percent of $(CH_3)_2SiO$ unit, 12 mole percent of $H(CH_3)SiO$ unit, and $CH_3SiO_{1.5}$ unit. The prepared silcone sponge rubber was found to have poor elastic properties and a tensile strength of only 16 kg./cm.$^2$. This was due to the scarcity of Si—H linkages relative to the total amount of the vinyl groups contained in the organopolysiloxane. Additionally the silicone sponge rubber was composed of foams, about half of which were found to be independent of each other.

EXAMPLE 4

90 parts of diorganopolysiloxane gum (component (a)), as was employed in Example 1, 10 parts of diorganopolysiloxane gum component (b)), having a viscosity of 6,000,000 cs. at 25° C., and consisting of 97.975 mole percent of dimethyl siloxy unit, 2 mole percent of methylvinyl siloxy unit, and 0.025 mole percent of dimethylvinyl siloxy unit, (viscosity of the mixture of (a) and (b): 5,000,000 cs.), 2.5 parts of methylhydrogen polysiloxane (component (c)), as was employed in Example 2, 40 parts of fumed silica (component (d)), 3 parts of dinitrosopentamethylenetetramine (component (e)), 0.002 part of chloroplatinic acid-n-butylamine (component (f)), and 4 parts of diphenylsilanediol were kneaded and cured by the same methods as described in Example 1. A silicone sponge rubber, consisting of comparatively rage foams, most of which were continuous was obtained. The physical properties of the product were found to be as follows:

Apparent density: 0.33
Tensile strength: 21 kg./cm.$^2$
Elongation: 300%
Flame retardant property: Observed Control 6

80 parts of diorganopolysiloxane gum (component (a)), as was employed in Example 1; 20 parts of diorganopolysiloxane gum (component (b)), having a viscosity of about 6,000,000 cs. at 25° C., and consisting of 98.975 mole percent of dimethylsiloxy unit, 1 mole perment of methylvinyl siloxy unit, and 0.025 mole percent of dimethylvinyl siloxy unit (viscosity of the mixture of (a) and (b): 5,000,000 cs.), 2.5 parts of methylhydrogen polysiloxane (component (c)), and 40 parts of fumed silica (component (d)) as was employed in Example 2, 3 parts of dinitrosopentamethylenetetramine (component (e)), 0.002 part of chloroplatinic acid-n-butylamine (component (f)), and 4 parts of diphenylsilanediol were kneaded and cured by the same methods as described in Example 1. A silicone sponge rubber, consisting of comparatively fine foams, most of which were independent of each other, was obtained. The physical properties of the product were found to be as follows:

Apparent density: 0.35
Tensile strength: 17 kg./cm.$^2$
Elongation: 310%
Flame retardant property: Observed

What is claimed is:
1. A silicone elastomeric composition comprising:
   (a) from 80 to 99 parts by weight of a diorganopolysiloxane gum, consisting of a first siloxy unit represented by the formula: $(R_2SiO)$ wherein R is a methyl or phenyl radical, and a second siloxy unit represented by the unit formula: $(CH_2=CHR'SiO)$ wherein R' is a methyl or phenyl radical and whose molecular chains are terminated by a monovalent radical selected from the group consisting of hydroxyl, methyl, trifluoropropyl, phenyl and vinyl group, having a viscosity of at least 1,000,000 cs. at 25° C., and containing from 0.025 to 0.25 mole percent of vinyl group containing siloxy units in its molecule;
   (b) from 1 to 20 parts by weight of diorganopolysiloxane, consisting of a first siloxy unit represented by the formula: $(R_2SiO)$ wherein R is a methyl or phenyl radical, and a second siloxy unit represented by the unit formula $(CH_2=CHR'SiO)$ wherein R' is a methyl or phenyl radical and whose molecular chains are terminated by a monovalent radical selected from the group consisting of methyl, ethyl, phenyl and vinyl group, having a viscosity of at least 10 cs. at 25° C., and containing at least 10 times as many mole percent of vinyl group containing siloxy units in its molecule as is contained in one molecule of the diorganopolysiloxane gum;
   (c) organohydrogen polysiloxane in an amount such that its Si—H linkages are from 50 to 200 mole percent of the total amount of vinyl groups contained in the diorganopolysiloxane gum and the diorganopolysiloxane, the organohydrogen polysiloxane containing at least three Si—H linkages in its molecule
   (d) from 20 to 100 parts by weight of a reinforcing silica filler having a surface area of at least 150 m.$^2$/g.;
   (e) from 1 to 10 parts by weight of a blowing agent; and
   (f) a catalytic amount of a platinum compound.
2. The elastomeric composition claimed in claim 1 in which a mixture of the diorganopolysiloxane gum and the diorganopolysiloxane has at 25° C. a viscosity of from 1,000,000 to 50,000,000 cs.
3. The elastomeric composition claimed in claim 1 in which the organohydrogen polysiloxane is selected from the group consisting of methylhydrogen polysiloxane whose molecular chains are terminated by a trialkylsilyl group, tetrasiloxanes represented by the formula

$Si[OSi(CH_3)_2H]_4$ siloxane copolymers consisting of $SiO_2$ unit and $(CH_3)_2HSiO_{0.5}$ unit, and copolymers of methylhydrogen siloxane and dialkyl siloxane.
4. The elastomeric composition claimed in claim 1 in which the blowing agent is selected from the group consisting of azobisisobutyronitrile, dinitrosopentamethylenetetramine, N,N'-dimethyldinitrosoterephthalamide, and diaminobenzene.
5. The elastomeric composition claimed in claim 1 in which the platinum compound is present in an amount such that the weight of platinum contained in it is from 1 to 100 p.p.m. of the total weight of the diorganopolysiloxane gum and the diorganopolysiloxane.
6. The elastomeric composition claimed in claim 1 in which the platinum compound is a soluble platinum compound selected from the group consisting of chloroplatinic acid, a complex of chloroplatinic acid and at least one of the following: ethylene, propylene, butadiene, and cyclohexane, and a complex of chloroplatinic acid, and alkylamine.
7. The elastomeric composition claimed in claim 1, further including a dispersing agent selected from the group consisting of low molecular siloxane esters and silanols.

8. A method for preparing silicone sponge rubber which comprises mixing:
(a) from 80 to 99 parts by weight of a diorganopolysiloxane gum, consisting of a first siloxy unit represented by the formula: ($R_2SiO$) wherein R is a methyl or phenyl radical, and a second siloxy unit represented by the formula: ($CH_2$=CHR'SiO) wherein R' is a methyl or phenyl radical and whose molecular chains are terminated by a monovalent radical selected from the group consisting of hydroxyl, methyl, ethyl, trifluoropropyl, phenyl and vinyl group, having a viscosity of at least 1,000,000 cs. at 25° C., and containing from 0.025 to 0.25 mole percent of vinyl group containing siloxy units in its molecule;
(b) from 1 to 20 parts by weight of diorganopolysiloxane, consisting of a first siloxy unit represented by the formula: ($R_2SiO$) wherein R is a methyl or phenyl radical, and a second siloxy unit represented by the formula: ($CH_2$=CHR'SiO) wherein R' is a methyl or phenyl radical and whose molecular chains are terminated by a monovalent radical selected from the group consisting of methyl, ethyl, phenyl and vinyl group, having a viscosity of at least 10 cs. at 25° C., and containing at least 10 times as many mole percent of vinyl group containing siloxy units in its molecule as is contained in one molecule of the diorganopolysiloxane gum;
(c) organohydrogen polysiloxane in an amount such that its Si—H linkages are from 50 to 200 mole percent of the total amount of vinyl group contained in the diorganopolysiloxane gum and the diorganopolysiloxane, the organohydrogen polysiloxane containing at least three Si—H linkages in its molecule;
(d) from 20 to 100 parts by weight of a reinforcing silica filler having a surface area of at least 150 m.²/g.;
(e) from 1 to 10 parts by weight of a blowing agent; and
(f) a catalytic amount of a platinum compound to form a mixture, and curing the mixture at from 100° to 400° C. from 5 minutes to 5 hours to produce a silicone sponge rubber.

9. The method claimed in claim 8 further including the step of subjecting the produced silicone sponge rubber to a post curing at from 150° C. to 250° C. for from 1 to 24 hours.

10. The method claimed in claim 8 in which a mixture of the diorganopolysiloxane gum and the diorganopolysiloxane has at 25° C. a viscosity of from 1,000,000 to 50,000,000 cs.

11. The method claimed in claim 8 in which the organohydrogen polysiloxane is selected from the group consisting of methylhydrogen polysiloxanes whose molecular chains are terminated by a trialkylsilyl group, tetrasiloxanes represented by the formula Si[OSi($CH_3$)$_2$H]$_4$, siloxane copolymers consisting of $SiO_2$ unit and $$(CH_3)_2HSiO_{0.5}$$

unit, and copolymers of methylhydrogen siloxane and dialkyl siloxane.

12. The method claimed in claim 8 in which the blowing agent is selected from the group consisting of azobisisobutyronitrile, dinitrosopentamethylenetetramine, N,N'-dimethyldinitrosoterephthalamide and diaminobenzene.

13. The method claimed in claim 8 in which the platinum compound is present in an amount such that the weight of platinum contained in it is from 1 to 100 p.p.m. of the total weight of the diorganopolysiloxane gum and the diorganopolysiloxane.

14. The method claimed in claim 8 in which the platinum compound is a soluble platinum compound selected from the group consisting of chloroplatinic acid, a complex of chloroplatinic acid and at least one of the following: ethylene, propylene, butadiene and cyclohexane, and a complex of chloroplatinic acid and alkylamine.

15. The method claimed in claim 8 wherein said mixture further includes a dispersing agent selected from the group consisting of low molecular siloxane esters and silanols.

References Cited
UNITED STATES PATENTS

| | | | |
|---|---|---|---|
| 3,527,655 | 9/1970 | Ballard | 260—825 |
| 3,425,967 | 2/1969 | Modic | 260—825 |

SAMUEL H. BLECH, Primary Examiner

M. FOELAK, Assistant Examiner

U.S. Cl. X.R.

260—37 SB, 465 U, 825